WRITE DRIVER CIRCUIT FOR A DIGITAL MAGNETIC RECORDING HEAD

Filed Oct. 21, 1965

INVENTOR
DANIEL A. WISNER

BY

FRANK W. BARNES
AGENT

INVENTOR
DANIEL A. WISNER
BY
FRANK W. BARNES
AGENT

United States Patent Office 3,438,054

Patented Apr. 8, 1969

3,438,054

WRITE DRIVER CIRCUIT FOR A DIGITAL MAGNETIC RECORDING HEAD

Daniel A. Wisner, Detroit, Mich., assignor to Burroughs Corporation, Detroit, Mich., a corporation of Michigan Filed Oct. 21, 1965, Ser. No. 499,705
Int. Cl. G01d *15/12*
U.S. Cl. 346—74 12 Claims

ABSTRACT OF THE DISCLOSURE

A circuit for driving a substantially square current waveform through an inductive load, such as a magnetic write head, which employs the complementary signals from a bistable device for alternately controlling the energization of a pair of symmetrical circuits to thereby present currents of opposite polarity to the load. Means are included in the drive circuit for limiting the magnitude of the steady state current level of the waveform and for providing a substantially resistance-free path for replacing the current limiting provision during the transient portions of the waveform. As disclosed herein, each symmetrical circuit provides a resistive steady state current path and a parallel resistance-free path which operate in sequence and in time relation to the transient and steady state current portions of the waveform. Means for discharging the transmission line connecting the output of the driver circuit with the inductive load is included for preventing the circuit from becoming pulse-repetition-frequency sensitive. The circuit is capable of operating in the nanosecond range free of oscillatory responses.

This invention relates to a digital magnetic recording system and more particularly to a transistorized write-driver circuit adapted for driving a high speed, digital, magnetic recording head.

In digital magnetic recording systems utilizing tapes, discs, or drums, substantially square current waveforms are required for driving the magnetic write head in order to be able to write a substantial amount of information accurately. A high value of steady state current is normally required as well as rapid rise and fall times for the current wave. For example, using a high inductance write coil of the order of 30 microhenrys, a 360 nanosecond current pulse of 150 millamperes is sufficient to write a readable bit. If the rise and fall times of the current pulse are kept within 100 nanoseconds, each write operation can be achieved in less than 500 nanoseconds.

In the prior art NRZ (Non-Return to Zero) systems, center-tapped auto-transformers are frequently used where each side of the auto-transformer is connected to a separate circuit, thereby forming a pair of symmetrical circuits having a common point, the center tap. The auto-transformer coil may either be wound directly on the magnetic write head, or may be used as the primary whose secondary drives current in a first and a second direction through windings on the write head. In recent years, electronic switches have been employed in each of the symmetrical circuits for turning on one symmetrical circuit while turning off the other symmetrical circuit. Therefore, current flows in one half of the auto-transformer in a first direction, and upon switching, current flows in the other direction in the other half of the auto-transformer. The result is a square current waveform.

However, current-limiting resistors have been required in each of the symmetrical circuits for limiting the value of the steady state current. The rise time of each of the symmetrical circuits is controlled by the current-limiting resistor, as well as by the magnitude of the driving voltage. In order to suppress the braking effect of the current-limiting resistor on the rise and fall times of each of the symmetrical circuits, by-pass capacitors have been positioned in parallel with the current-limiting resistors. This approach has been found to have serious difficulties. In the first place, in a write head having a specified value of inductance, the value of the capacitor which would give the greatest rise time is also that which satisfies the condition of oscillatory response. Furthermore, the value of the capacitance which may be utilized is further affected by the RC time constant which can be tolerated without having the system become pulse-repetition-frequency sensitive.

Nevertheless, the importance of achieving a satisfactory method of by-passing the current limiting resistor can hardly be over-emphasized. For example, in order to obtain a rise time of 100 nanoseconds to reach a steady state current of 150 milliamperes, through a 30 microhenry inductance, a theoretical driving potential of 45 volts is required in a resistance free circuit. However, if transistors, with their inherent advantages of high speed, low cost, and low power consumption, are used as the electronic switches, the useable driving voltage is limited by the maximum collector-emitter breakdown voltage which the non-conducting transistor can sustain. Additionally, owing to the well known auto-transformer effect, the voltage across the switching transistor of the non-conducting symmetrical circuit can reach twice the driving voltage. Hence, the collector-emitter breakdown voltage of the switching transistors must be greater than twice the driving voltage in the prior art.

A second important difficulty with prior art circuits arises when the operation is in the nanosecond range. Nanosecond speeds make a transmission line desirable for connecting the circuits with the inductance coils. As is well known, substantial charging currents are required to charge such a transmission line. In order to prevent a system using a transmission line from becoming pulse-repetition-frequency sensitive due to the charging currents stored in the line, some method must be employed to rapidly discharge a charged transmission line.

It is thus the principal object of this invention to improve transistorized, digital, write-driver circuits operable in the nanosecond range.

It is another object of this invention to provide a transistorized write-driver circuit operable in the nanosecond range that is free from oscillatory difficulties.

It is a further object of this invention to provide a transistorized write-driver circuit operable in the nanosecond range that is not pulse-repetition-frequency sensitive.

In carrying out the above-mentioned objectives, applicant's inventive concept utilizes the complementary signals from a bistable device for alternately controlling a pair of symmetrical circuits, each having a transient, substantially resistance free circuit and a resistive steady state circuit, operating in sequence, which allow a rapid rise time to a steady pulse level, for driving, through a twisted transmission line, a pair of inductance coils wound in an auto-transformer configuration and located on a digital, magnetic write head.

Applicant's invention also provides circuitry for discharging the nonconducting transmission line in order to prevent the circuit from being pulse-repetition-frequency sensitive.

For purposes of simplicity and ease of understanding, applicant's invention is first described with reference to FIG. 1, wherein idealized perfect switches are utilized. As will be shown hereinafter, with reference to the other figures, applicant's invention encompasses the use of transistor switching circuits in lieu of the idealized switches of FIG. 1.

Figure 1:
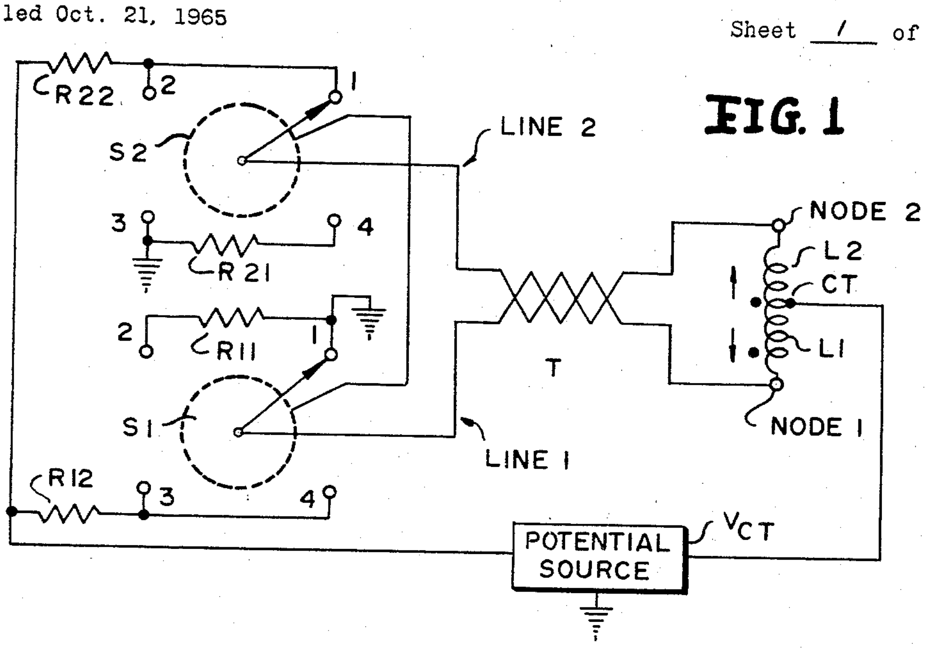
FIG. 1 is a schematic representation of applicant's invention, wherein idealized perfect switches are assumed.

The idealized circuit of FIG. 1 includes a pair of substantially equal inductance coils L1 and L2 wound about a magnetic recording head, not shown, in an auto-transformer configuration having a center tap CT directly coupled to a source of potential V*ct*, a pair of four-position, perfect ganged switches S1 and S2, a first pair of equal resistors R11 and R12, a second pair of equal resistors R21 and R22, and a twisted pair transmission line T. Two substantially symmetrical circuits are formed leading from center tap CT through an inductance coil L1 or L2, twisted pair transmission line T to the four-position perfect switches S1 or S2, respectively. Position 1 of switch S1 is connected to a source of reference potential, such as ground, position 2 through resistor R11 to a like source of reference potential, and positions 3 and 4 through resistor R12 to source V*ct*. Positions 1 and 2 of switch S2 are connected through resistor R22 to source V*ct*, position 3 to a source of reference potential such as ground, and position 4 through resistor R21 to a like source of reference potential. Nodes 1 and 2 are between the transmission line T and the free end of coils L1 and L2, respectively.

When switches S1 and S2 are thrown from position 4 to position 1, there is an initial rush of current through line 1, thereby charging line 1 of transmission line T and sending a reference potential wave, such as ground, to Node 1. When the reference potential wave propagates to Node 1, the voltage at Node 1 drops from V*ct* to the reference, thus placing a potential substantially equal to V*ct* between Node 1 and center tap CT. Node 2 then charges toward 2V*ct* due to auto-transformer coupling between coils L1 and L2, allowing line 2 of transmission line T to discharge rapidly through resistor R22, thereby preventing the system from being pulse-repetition-frequency sensitive. Switches S1 and S2 remain in position 1 until the desired steady state current flowing through inductance coil L1 is reached. Switches S1 and S2 are then thrown from position 1 to position 2, thereby placing resistor R11 in series with the inductance L1. Resistor R11 is chosen so as to sustain substantially the full center tap voltage drop V*ct* for the desired steady state current. The charge on the transmission line T is redistributed somewhat, and the parallel circuits are quiescent.

The above sequence of events is reversed when switches S1 and S2 are thrown from position 2 to position 3. When switches S1 and S2 are first placed in position 3, there is an initial rush of current through line 2, charging transmission line T. When the reference potential wave propagates to Node 2, the voltage at Node 2 drops from V*ct* to the reference, thus placing a potential substantially equal to V*ct* between Node 2 and center tap CT. Node 1 then charges toward 2V*ct* due to auto-transformer coupling between coils L2 and L1. Switches S1 and S2 remain in position 3 until the desired total steady state current value is reached. Then switches S1 and S2 are thrown from position 3 to position 4, placing series resistor R21 in series with inductance L2. The charge on the transmission line T is redistributed somewhat, and the circuit is quiescent.

As shall be shown in the following sections, the significance of the above-described idealized switches S1 and S2 is derived from their being replaceable by inexpensive transistors, thereby effectively by-passing the current limiting resistors, while not subjecting the circuit to the dangers of oscillation. In addition, the use of resistors R12 and R22 provides an inexpensive and highly effective method of discharging the transmission line T, which prevents the system from being pulse-repetition-frequency sensitive.

Figure 2:
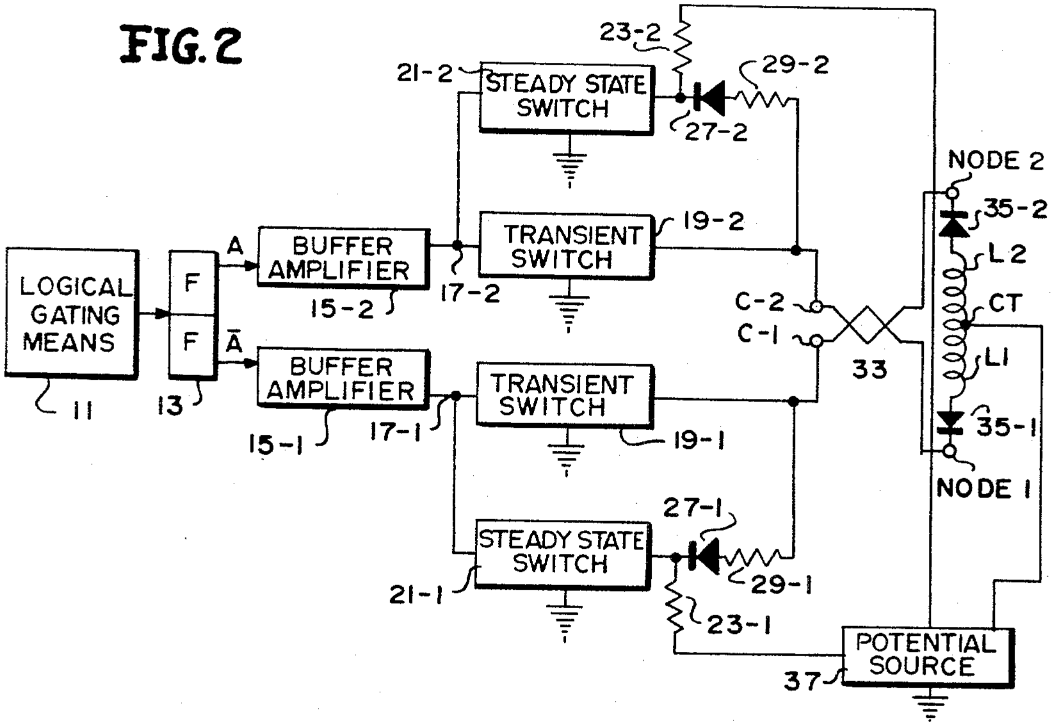
FIG. 2 is a modified block diagram of a write-driven circuit employing the principles of applicant's invention.

With reference to FIG. 2, the functions of switch S1 are handled by transient switch 19–1 and steady state switch 21–1, and the functions of switch S2 by transient switch 19–2 and steady state switch 21–2. Resistor R11 is replaced by resistor 29–1, and resistor R21 by resistor 29–2. The functions of resistors R11 and R22, as shown in FIG. 1, are performed by series resistors 29–1, 23–1, and 29–2, 23–2, respectively. A transmission line 33 connects the symmetrical circuits to the free ends of inductance coils L1 and L2 through diodes 35–1 and 35–2, respectively, diodes 35–1 and 35–2 insuring that current in each coil flows in only one direction. The voltage at center tap CT is provided by potential source 37. Applicant's preferred form of transmission line 33 is a short length, about 5 feet, of standard 95 ohm transmission cable such as RG–22–B/U.

FIG. 2 shows one method for alternately controlling switch pairs 19–1, 21–1, and 19–2, 21–2 with individual switches in said pairs operating sequentially, utilizing buffer amplfiers 15–1 and 15–2, flip-flop 13, and logical gating means 11. Buffer amplifiers 15–1 and 15–2 place an on voltage signal at junction 17–1 and an off voltage signal at junction 17–2 in response to signal $\overline{A}$ from flip-flop 13 to buffer amplifier 15–1 and signal A to buffer amplifier 15–2. When flip-flop 13 switches states, an off voltage signal is placed at junction 17–1 and an on voltage signal at junction 17–2. The state of flip-flop 13 is controlled by logical gating means 11.

Many logical gates known in the art may be used to apply a switching signal to flip-flop 13. When an on voltage signal appears at point 17–1 and an off signal is placed at point 17–2, transient switch 19–1 and steady state switch 21–1 are closed or energized. Since the anode of diode 27–1 is clamped substantially at a reference potential such as ground, it becomes back biased, thereby providing only one path from inductance L1 to ground. Thus, in a manner analogous to moving switches S1 and S2 from position 4 to position 1, current flows from coil L1 through transient switch 19–1 to the reference potential, while the path for current through coil L2 is through resistors 29–2 and 23–2 to the center tap CT, through potential source 37. After a predetermined period of time, transient switch 19–1 opens, thereby forward biasing diode 27–1, creating a current path from inductance L1 through current limiting resistor 29–1 to the reference. This action is similar to what occurs when switches S1 and S2 change from position 1 to position 2.

Upon receiving a switching signal from logical gating means 11, flip-flop 13 changes state, thereby placing an on voltage signal at point 17–2, while placing an off voltage signal at point 17–1. Since the anode of diode 27–2 is now clamped substantially at the reference potential, it becomes back biased. Only one path is provided from inductance L2 to the reference potential. Thus, in a manner analogous to switching switches S1 from position 2 to position 3, current flows from coil L2 through transient switch 19–2 to the reference, while the path through coil L1 is through resistors 29–1 and 23–1 and potential source 37 to center tap CT. After a predetermined period of time, transient switch 19–2 opens or is de-energized, thereby forward biasing diode 27–2 and creating a current path from inductance coil L2 through current limiting resistor 29–2 to the reference potential. This action is similar to what occurs when switches S1 and S2 change from position 3 to position 4.

Diodes 27 may be omitted from the circuit of FIG. 2 without substantially altering the operation of the circuit, since the primary current path in the absence of diodes 27, when both switches 19 and 21 are open, is through the transient switch path. However, the addition of diodes 27 more completely eliminates the steady state path, thereby favorably altering the rise time.

Figure 4:
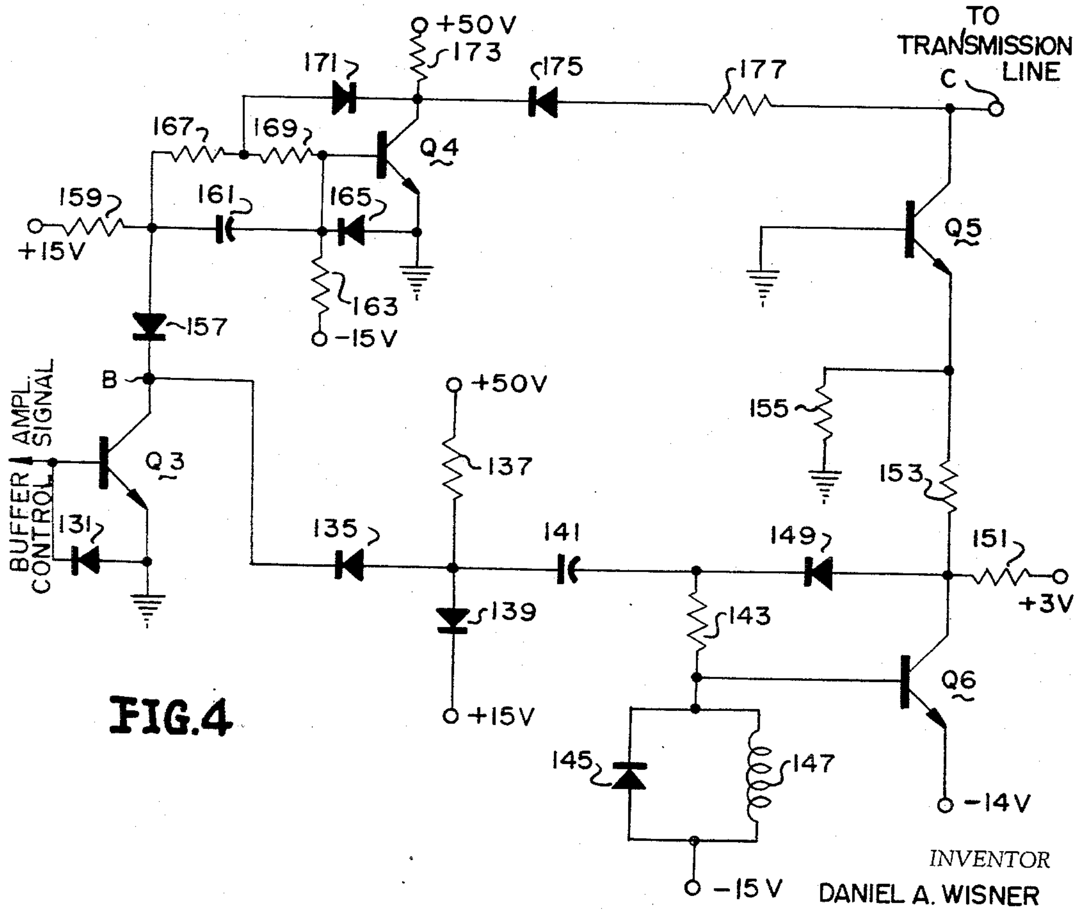
FIG. 4 is a circuit diagram of the preferred embodiment of one of applicant's symmetrical switching circuits of FIG. 2.

As is readily apparent to those skilled in the art, transient switches 19–1 and 19–2 and steady state switches 21–1 and 21–2 may readily be replaced by transistorized circuitry, as shown in FIG. 4, hereinafter described in detail. Any form of logical circuitry, which would place an on voltage signal at point 17–1 while placing an off voltage signal at point 17–2, and the converse, could be utilized with this circuit. Logical gating means 11, flip-flop 13, and buffer amplifiers 15–1 and 15–2 are simply representative of this class of circuitry.

Figure 3:
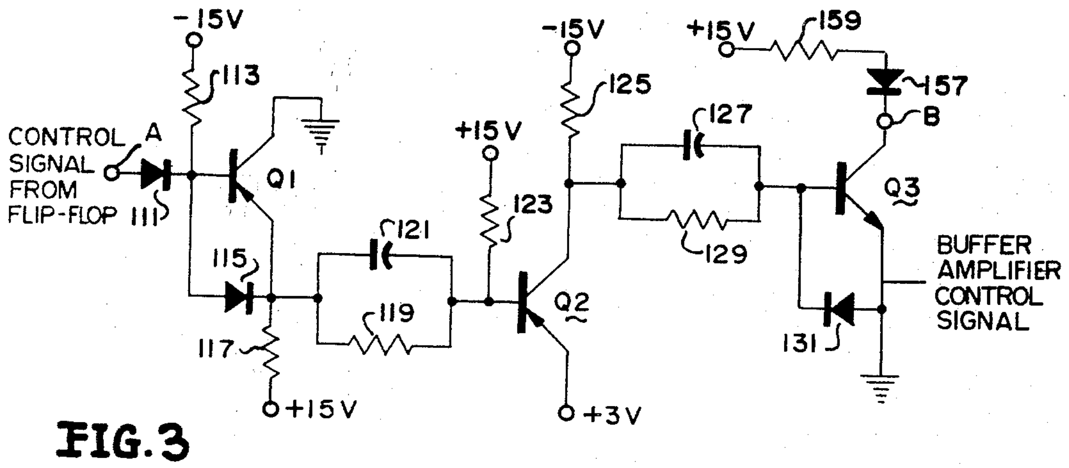
FIG. 3 is a circuit diagram showing the preferred embodiment of applicant's buffer circuitry.

FIG. 3 is a schematic of a buffer amplifier, which may be utilized in applicant's write-driver circuit. As is apparent to those skilled in the art, a variety of well-known buffer circuits could be substituted for the circuit of FIG. 3, hereinafter described.

FIG. 3 shows an emitter follower Q1 and power inverters Q2 and Q3. Q1 and Q2 are shown as PNP transistors and Q3 is shown as an NPN transistor. The base of emitter follower Q1 is biased by —15 volt source through resistor 113, and its emitter is biased by a 15 volt source through emitter resistor 117. Diode 115 prevents the base voltage of emitter follower Q1 from rising substantially above its emitter voltage. In the absence of a positive signal appearing at point A, emitter follower Q1 is on, placing its emitter at approximately ground. Power inverter transistor Q2 has its emitter tied to a 3 volt source and its collector tied to a —15 volt source through resistor 125. The base of transistor Q2 is tied both to the emitter follower Q1 through resistor 119 and speed-up capacitor 121 in parallel and to a 15 volt source through resistor 123, resistor 123 being large with respect to resistor 119. In the absence of a positive signal at point A, power inverter Q2 is also on, and the collector of inverter Q2 therefore sits at approximately +3 volts. Power inverter Q3 has its emitter grounded and its collector biased by a 15 volt source through resistor 159 and diode 157. Diode 131 prevents the base of power inverter Q3 from dropping substantially below ground. The base of power inverter Q3 is connected to the collector of power inverter Q2 through resistor 129 and speed-up capacitor 127 in parallel. In the absence of a positive signal at point A, the collector of power inverter Q2 sits substantially at +3 volts. Thus, power inverter Q3 is also on, placing the collector of power transistor Q3 substantially at ground.

When a positive signal of approximately 3 to 4 volts appears at point A from the flip-flop 13 of FIG. 2, the emitter of emitter follower Q1 changes to substantially the signal voltage, placing the signal voltage at the base of power inverter Q2 through speed-up capacitor 121, thereby turning off power inverter Q2. When Q2 turns off, approximately —15 volts is initially placed at the base of power inverter Q3 through speed-up capacitor 127, and power inverter Q3 is turned off, thereby placing the collector of power inverter Q3 at approximately 15 volts.

With reference to FIG. 4, there is shown therein applicant's preferred circuitry for implementing each of the pair of symmetrical circuits of FIG. 2. Although FIG. 4 is described hereinafter as replacing the first symmetrical circuit of FIG. 2, a like circuit also replaces the second symmetrical circuit. Power inverter Q3 of the buffer amplifier of FIG. 3 is shown driving the switching circuitry of FIG. 4. The switching circuitry of FIG. 4 is hereinafter described assuming potential source 37 in a 50 volt source.

Node C leads from the switching circuitry to one of the lines of transmission line 33 of FIG. 2. Transient switch 19–1 of FIG. 2 is replaced in part by transient transistors Q5 and Q6. Steady state switch 21–1 of FIG. 2 is replaced by steady state transistor Q4. Steady state transistor Q4 and transient transistors Q5 and Q6 are shown as the NPN type. The collector of transistor Q5 is tied to Node C and the base of transistor Q5 is grounded. The emitter of transistor Q5 is tied to ground through resistor 155 and is also coupled to the collector of transistor Q6 through resistor 153. Transistor Q6 has its emitter connected to a —14 volt source and its collector biased by a +3 volt source through resistor 151. The base of transistor Q6 is coupled through inductance 147 to a —15 volt source. Diode 145 is connected in parallel with inductance 147, having its anode tied at —15 volts. The base of transistor Q6 is connected to its collector through resistor 143 and diode 149, diode 149 having its anode coupled to the collector of transistor Q6. Timing capacitor 141 has one plate connected to a junction point of three circuits: (1) one circuit connects the junction point through resistor 137 to a +50 volt source; (2) the second connects it through diode 139 to a +15 volt source, diode 139 having its cathode at +15 volts; and (3) the third circuit connects the junction through diode 135 to the collector of power inverter Q3, diode 135 having its cathode connected to Node B. The other plate of capacitor 141 is connected to the base of transient switching transistor Q6 through resistor 143.

Node C is also connected through resistor 177 and diode 175 to the collector of grounded emitter steady state transistor Q4 with diode 175 having its cathode connected to the collector of transistor Q4. The collector of steady state transistor Q4 is biased by a +50 volt source through resistor 173. The base of steady state transistor Q4 is biased by a —15 volt source through resistor 163. The emitter and base of steady state transistor Q4 are connected through diode 165, the anode of diode 165 being grounded. The collector and the base of the steady state transistor A4 are coupled by resistor 169 and diode 171, the cathode of diode 171 being connected to the collector of steady state switching transistor Q4. Node B is coupled to the base of steady state transistor Q4 through diode 157 and capacitor 161 and resistors 167 and 169, resistors 167 and 169 being in series, and capacitor 161 being in parallel with series resistors 167 and 169. As diode 157 has its cathode tied to Node B, its anode sits slightly above ground when power inverter Q3 is on. Steady state transistor Q4 is thereby biased off by a —15 volt source connected to its base through resistor 163. In addition, with power inverter Q3 on, there is no substantial potential difference between resistor 137 and capacitor 141.

When the transistor Q3 is on, the emitter of transient transistor Q6 sits at —14 volts, and its base is tied to a —15 volt source through inductance 147. In this condition, transistor Q6 is biased off. As the collector of transistor Q6 is biased by a +3 volt source through resistor 151, the collector voltage, when transistor Q6 is off, is approximately +3 volts. As transient transistor Q5 has its base grounded and its emitter connected to the collector of transient Q6 through resistor 153, transistor Q5 is also off when transistor Q6 is off. With transient switching transistor Q5 off and power inverter Q3 on, approximately 15 volts appears across the plates of timing capacitor 141. With the switching transistors of the circuit of FIG. 4 biased off, it is apparent that the only current path out of Node C is through resistors 177 and 173 to the center tap CT of FIG. 2.

When power inverter Q3 turns off, Node B rises to approximately +15 volts, turning on steady state switch Q4 through speed-up capacitor 161 and resistors 167 and 169. At the same time, the potential between resistor 137 and capacitor 141 rises to +15 volts. Thus, the base of switching transistor Q6 is initially forced positive in respect to —14 volts, owing to the 15 volt drop across the plates of capacitor 141, turning transistor Q6 on. With transistor Q6 on its collector potential drops rapidly below ground, turning on transient transistor Q5. When transient switching transistor Q5, which has its base grounded, is on, both the current flowing through transistor Q5 and resistor 155, and the current flowing from ground through resistors 155 and 153 to the collector of transient switching transistor Q6 clamp the emitter of transistor Q5 substantially at ground. The forward resistanec across the emitter-collector junction of transistor Q5 will be very low, and hence a substantially resistance free path to slightly below ground is provided for current flowing at Node C. Looking at the circuit in a slightly different way, since the base of transistor Q5 is grounded, and the impedance of the base-collector junction is low, a substantially resistance free path to ground is provided. Current will not flow through steady state transistor Q4 from Node C, as diode 175 is back biased.

Capacitor 141 charges through resistor 143 in series with the base-emitter junction of switching transistor Q6 to a −14 volt source and inductance 147 to a −15 volt source. Most of the charging current will initially go through the base-emitter junction of switching transistor Q6. However, the current through inductance 147 will increase with time and just prior to the time when the current through inductance 147 levels off, switching transistor Q6 turns off. Capacitor 141 continues charging toward having 30 volts across its plates, first through inductance 147 until the current through inductance 147 starts to decrease, and then through diode 145, diode 145 having become forward biased, thereby removing inductance 147. Using the representative value parameters set forth in Table I infra, switching transistor Q5 is on for about 100 nanoseconds. Diode 149 is positioned to prevent switching transistor Q6 from saturating, thereby decreasing its turn-off time.

When switching transistor Q5 turns off, diode 175 becomes forward biased and the path to ground for the current in the transmission line is through Node C, current limiting resistor 177, diode 175, and steady state transistor Q4.

When flip-flop 13 of FIG. 2 changes state, the other or second symmetrical circuit is turned on and conducts in the manner described above, while the first symmetrical circuit is turned off. In this condition, resistor 177, diode 175, and resistor 173 of the nonconducting symmetrical circuit provide a path to discharge the transmission line connected thereto.

Table I infra sets forth representative values of the components of FIGS. 2, 3, and 4. Resistances are in ohms, capacitances in picofarads, and inductances in microhenrys. These circuit parameters are designed to give rise and fall times of the order of 100 nanoseconds, where driving potential source 37 is 50 volts. As is apparent to those skilled in the art, the following values may be modified without departing from the scope of applicant's teaching.

*Table I*

| | |
|---|---|
| L1 and L2 | 30 |
| Transmission line **33** | 95 |
| R–**113** | 10K |
| R–**117** | 1.5K |
| R–**119** | 820 |
| C–**121** | 270 |
| R–**123** | 30K |
| R–**125** | 1.5K |
| C–**127** | 330 |
| R–**129** | 300 |
| R–**137** | 903 |
| C–**141** | 91 |
| R–**143** | 15 |
| L–**147** | 15 |
| R–**151** | 3.3K |
| R–**153** | 30 |
| R–**155** | 820 |
| R–**159** | 529 |
| C–**161** | 330 |
| R–**163** | 4.7K |
| R–**167** | 240 |
| R–**169** | 240 |
| R–**173** | 8K |
| R–**177** | 300 |

Thus, the applicant has shown how parallel current paths may be controlled with transistors so that a substantially resistance free path is closed for a predetermined period governed by an RC circuit, while the resistance-containing circuit is opened by a back-biased diode. Then at the termination of the predetermined period, the resistance free circuit is opened and the resistance-containing circuit is closed. In addition, specially positioned resistors are used in conjunction with a transmission line preventing the circuit from becoming pulse-repetition-frequency sensitive.

What is claimed is:

1. A circuit for driving a substantially square current waveform through a high-speed, digital, magnetic write-head comprising first and second inductance coils, said coils being wound on said write-head in auto-transformer configuration and having a common junction, means for coupling said common junction to a source of reference potential, means for generating first and second complementary bi-level electric signals, a pair of symmetrical circuits, each circuit being coupled to an individual one of said coils and being controlled by said bi-level signals, each of said symmetrical circuits including a junction point, means responsive to one level of its associated bi-level signal for providing a substantially resistance-free current path from said junction point to a point of reference potential for a predetermined period of time and additionally providing a current path having current-limiting resistance from said junction point to said point of reference at the termination of said predetermined period and for providing a current path from said junction point to said center tap in response to the other level of said bi-level signal, and means for coupling the respective junction points of said symmetrical circuits to their respective inductance coils.

2. A circuit for driving a substantially square current waveform through a digital, magnetic write-head comprising first and second inductance coils for inducing signals in said write-head, said coils being wound in an auto-transformer configuration and having a center-tap connected at the junction of said coils, means for generating a pair of complementary signal voltages, each of said signal voltages having a first and a second level, said means additionally including means for simultaneously switching each of said signal voltages from one of its levels to the other level, a pair of symmetrical circuits, each controlled by an individual one of said pair of signal voltages and each of said circuits including first and second junction points, means for electrically coupling said first junction point to the free end of an individual inductance coil, means including a transient transistor switch for providing a substantially resistance-free circuit path between said first junction point and said second junction point for a predetermined period of time, a steady state switching transistor having emitter, base, and collector electrodes, and being biased to conduct upon application of the first level of its associated voltage to its base, said emitter being connected to said second junction point, means including a current limiting resistor for electrically connecting said collector to said first junction point, means for electrically coupling the associated signal voltage both to said means for providing a substantially resistance-free path and to said base of said steady state switching transistor, whereby said steady state switching transistor is continuously conducting during application of said first level, and said transient transistor switch is conducting only for said predetermined period of time, and said steady state switching transistor is nonconducting in response to said second level, and means for providing a reference potential between said second junction point and said center tap of each of said symmetrical circuits.

3. The circuit of claim 2 wherein said means for electrically connecting said collector to said first junction point additionally includes an asymmetrical current conductive device, said device being poled to present a high impedance during said predetermined period of time and a low impedance thereafter.

4. The circuit of claim 2 wherein said circuit means for coupling said first junction point of one of said symmetrical circuits to said free end of its associated inductance coil and wherein said circuit means for coupling said first junction point of the other of said symmetrical circuits to its associated induction coil includes a transmission line having first and second terminals at both its first and its second ends, said first and second terminals at said first end being connected to the free ends of said first and second inductance coils, respectively; said first and second terminals of said second end being connected to said first junction point of said first circuit and said first junction point of said second circuit, respectively; and wherein said circuit of claim 2 additionally includes individual means for connecting the resistive path of each of said symmetrical circuits to a reference potential for discharging the nonconductive path of said transmission line.

5. The circuit of claim 4 wherein said means for providing a substantially resistance free circuit path between said first junction point and said second junction point of each of said symmetrical circuits including an RC timing circuit coupled to said transient transistor switch.

6. A transistorized switching circuit comprising input control means for initiating and terminating the response of said circuit, transient transistor switching means for initially responding to said input control means, RC time constant means for controlling the length of time said transient transistor switching means responds to said input control means, steady state transistor switching means for providing a steady response upon termination of said initial response of said transient transistor switching means, and output means connected to said transient transistor switching means and said steady state transistor switching means.

7. A circuit for driving a signal of substantially square wave through a center-tapped inductance coil comprising means for applying a DC potential to said center-tap, a pair of symmetrical switching circuits, each of said pair including a substantially resistance-free path and an alternative resistance path and switching means for opening said resistance-free path in sequence a predetermined time after the latter path begins to conduct, a transmission line having a pair of terminals at each end, said terminals at one end being coupled to different ends of said inductance coil and said pair of terminals at the other end being coupled to individual ones of said pair of symmetrical switching circuits, control means for alternately activating said switching circuits, and, means individual to each of said switching circuits for discharging the deactivated path of said transmission line.

8. A driving circuit for a digital magnetic write-head comprising a pair of symmetrical circuits each having a transient, substantially resistance-free path and a resistive steady state path, operating in sequence, means for alternately energizing said pair of symmetrical circuits, a center-tapped inductance coil located on said write head, a source of reference potential connected to said center-tap, connecting means for coupling individual ones of said pair of spmmetrical circuits to individual ends of said inductance coil, and discharge means for coupling the de-energized one of said pair of alternately energized symmetrical circuits to said source of reference potential.

9. A transistorized switching circuit for impressing a substantially square-shaped current waveform on an inductive load which comprises a substantially resistance-free transient current path, a resistive steady state current path, means for connecting the current output of said paths to the inductive load, means for initiating a pulse waveform, means for determining the duration of the transient portion of said pulse waveform, and transistor switching means responsive to said initiating means and said determining means for controlling current flow through said paths and operable to conduct the transient current portions of each waveform through only the resistance-free path and to conduct the steady state current portion of each waveform through only the resistive path.

10. A transistorized switching circuit for impressing a substantially square waveform upon an inductive load comprising input control means for initiating and terminating the response of said circuit, means for monitoring the output waveform of said control means and determining an initial rise portion and a subsequent steady portion of said output waveform, transistor switching means responsive to said monitoring means for providing an initial response during said initial rise portion and a second response upon termination of said initial response, and output means for transmitting the response of said transistor switching means to said inductive load.

11. A circuit for presenting substantially square-shaped current waveforms of opposite polarities to an inductive load, means for generating first and second complementary bi-level electric signals, a pair of symmetrical circuits controlled by said bi-level signals so that one symmetrical circuit conducts current waveforms of one polarity and the other symmetrical circuit conducts current waveforms of the opposite polarity.

means operatively associated with said symmetrical circuits and responsive to each level of the bi-level signal for providing a substantially resistance-free current path for the transient period of time of each waveform and further providing a current path having current-limiting resistance for the steady current period of time of each waveform, and means for coupling the respective outputs of said current paths to an inductive load.

12. A drive circuit for presenting a write current of either of two polarities to a magnetic recording head comprising first and second symmetrical circuits, means providing a substantially resistance-free current path from each symmetrical circuit to the head, means providing a resistive current path from each symmetrical circuit to the head, switch means operative to select either one of said path means exclusive of the other for current conduction to the head, means responsive to a first input signal applied to an input terminal of the first circuit for operating the switch means to select the resistance-free path means for conduction of current to the head which effects a write current of a first polarity in the head, means responsive to the first input signal for operating the switch means after a predetermined period of time to select the resistive path means for conduction of current to the head which maintains a first polarity write current of predetermined magnitude in the head, means responsive to a second input signal applied to an input terminal of the second circuit for operating the switch means to select the resistance-free path means for conduction of current to the head which effects a write current of a second polarity in the head, and means responsive to the second input signal for operating the switch means after a predetermined period of time to select the resistive path means for conduction of current to the head which maintains a second polarity write current of predetermined magnitude in the head.

References Cited

UNITED STATES PATENTS 3,243,606 3/1966 Green et al.
2,995,667 8/1961 Clapper et al.

BERNARD KONICK, *Primary Examiner.*

LEE J. SCHROEDER, *Assistant Examiner.*

U.S. Cl. X.R.

307—268; 340—174.1

U.S. DEPARTMENT OF COMMERCE
PATENT OFFICE
Washington, D.C. 20231

UNITED STATES PATENT OFFICE

CERTIFICATE OF CORRECTION

Patent No. 3,438,054 April 8, 1969

Daniel A. Wisner

It is certified that error appears in the above identified patent and that said Letters Patent are hereby corrected as shown below:

Column 1, line 47, "millamperes" should read -- milliamperes --. Colu 5, line 67, "in" should read -- is --. Column 6, line 33, "A4" should read -- Q4 --. Column 7, line 4, "resistanec" should read -- resistance --; lin 64, "15" should read -- 30 --. Column 10, line 18, "spmmetrical" should read -- symmetrical --.

Signed and sealed this 7th day of April 1970.

(SEAL)
Attest:

Edward M. Fletcher, Jr.
Attesting Officer

WILLIAM E. SCHUYLER, J
Commissioner of Paten